United States Patent [19]

Moteki

[11] Patent Number: 4,807,063
[45] Date of Patent: Feb. 21, 1989

[54] HEAD POSITION CONTROL SYSTEM WITH MULTIPLE SERVO AREAS STAGGERED ON VARIOUS DISKS

[75] Inventor: Eiji Moteki, Kawasaki, Japan

[73] Assignee: Fuji Electric Company Ltd., Kawasaki, Japan

[21] Appl. No.: 53,824

[22] Filed: May 26, 1987

[30] Foreign Application Priority Data

May 27, 1986 [JP] Japan .................................. 61-121468

[51] Int. Cl.$^4$ ............................................. G11B 5/596
[52] U.S. Cl. .............................. 360/77.07; 360/78.04; 360/98.01
[58] Field of Search .............................. 360/75, 77, 78

[56] References Cited

U.S. PATENT DOCUMENTS 4,737,869  4/1988  Sugaya et al. ........................ 360/77

FOREIGN PATENT DOCUMENTS

3036850  5/1952  Fed. Rep. of Germany .
53-76813  7/1978  Japan .
53-83717  7/1978  Japan .
55-150161 11/1980  Japan .
61-59674  3/1986  Japan .
62-117173  5/1987  Japan .
2191877  12/1987  United Kingdom .

*Primary Examiner*—Alan Faber
*Assistant Examiner*—David L. Robertson
*Attorney, Agent, or Firm*—Spencer & Frank

[57] ABSTRACT

Two reference information storage regions are arranged on each major surface of each disc with an angular spacing of 360°/4N (where N is the number of discs). The reference information storage regions for the respective discs are equiangularly displaced from each other, so that the reference information is read out from the angularly displaced reference information storage regions during each one rotation of the disc so as to detect a displacement of the head from its normal or proper position every time that the reference information is read out, and the displacement of the head is corrected in accordance with the detected displacement.

4 Claims, 7 Drawing Sheets

HEAD POSITION CONTROL SYSTEM WITH MULTIPLE SERVO AREAS STAGGERED ON VARIOUS DISKS

BACKGROUND OF THE INVENTION

1. Field of the Invention

The present invention relates to a head position control system for a disc storage unit which has a plurality of rotating discs as recording medium; and a plurality of transducer heads, whose positions are controllable, for writing and/or reading out data in and/or from the corresponding major surfaces of the discs, and in which a plurality of tracks for storing data and reference information storage regions extending radially and intersecting circumferentially the plurality of recording tracks so that portions of each of the tracks are allotted to the regions to store reference information for detecting a position of each head in said region s are provided on each major surface of each of the discs and the position of each head is detected by reading out the reference information from the reference information storage region through the head to control the position of the head.

2. Description of the Prior Art

In the disc storage unit of the type described above, the head must be displaced from one track to a specific track and must be properly positioned in relation to this specific track of data. As is well known in the art, in order to shift and properly position the head in relation to the specific track of data at a particular radius on the disc, open and closed loop systems have been used. In case of the open loop system, only a signal representative of a shift distance of the head such as a predetermined number of pulses is applied to a stepping motor and the present position of the head is not detected at all so that the position control in a strict sense is not carried out. The open loop system has been widely used in case of a disc storage unit in which it is not needed to precisely position the head in relation to a specific track of data at particular radii of the disc.

A data-packaging density of a disc storage unit, however, has been much increased recently so that a pitch between adjacent tracks becomes narrower. As a result, various problems arise when the head is even slightly deviated from its correct position, and thus a demand for a closed loop control system has been expanded.

In case of the closed-loop position control method, the present position of the head must be detected and applied as an actual value to a position control circuit. For this purpose, reference information or servo information to be used to detect the position of the head must be written on the disc Therefore, the closed loop system is sometimes called a servo system. The servo system includes a servo-surface-servo system and a data-surface servo system.

In case of the servo-surface-servo system, one surface of a storage disc is exclusively used for the storage of reference information so that information representative of the present position of the head can be read out from the reference information storage surface at any time independently of the operation for writing or reading out data onto or from the other surface of the disc. As a result, in response to the reference information stored on the one surface of the disc, the position of the head can be always corrected so that the head can be properly positioned in relation to a specific track of data. This system, however, has an inherent defect that a data storage capacity is considerably reduced, since one of the surfaces of the disc must be exclusively used for the storage of reference information as described above.

On the other hand, in case of the data-surface-servo system, reference information is written only into one portion of each track of data in the circumferential direction. Therefore, unlike the servo-surface-servo system, the head position information cannot be read out at any time, but in general it suffices to correct the position of the head in response to the reference signal read out every time when the disc makes one rotation. Therefore, the data-surface-servo system has a distinctive advantage that the space for the storage of reference information on the surfaces of the disc can be reduced and accordingly a data storage capacity needs almost not be reduced.

The present invention is directed to the data-surface-servo system of the type described above.

However, the data-surface-servo system has a relatively long seek time required for shifting the head from one track to a specific track and then positioning it properly at a specific track position, so that an access time required for finding a desired track for the writing or reading of date becomes longer as will be described in detail hereinafter with reference to FIGS. 1A, 1B and 2.

Figure 1A:
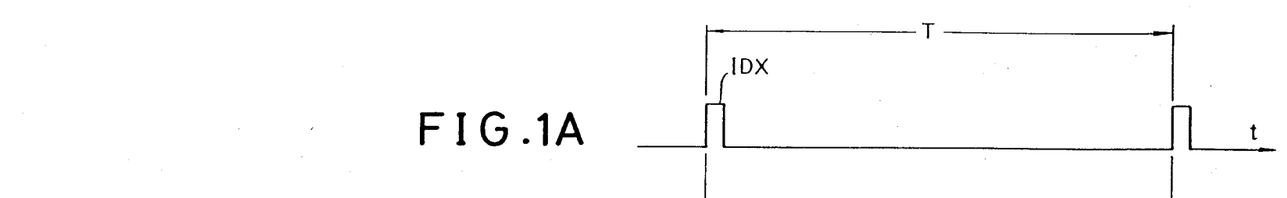
FIGS. 1A and 1B are exlanatory diagrams used to explain an arrangement of reference information on a track of a conventional data-surface servo system in conjunction with an index pulse for synchronization.
Figure 1B:
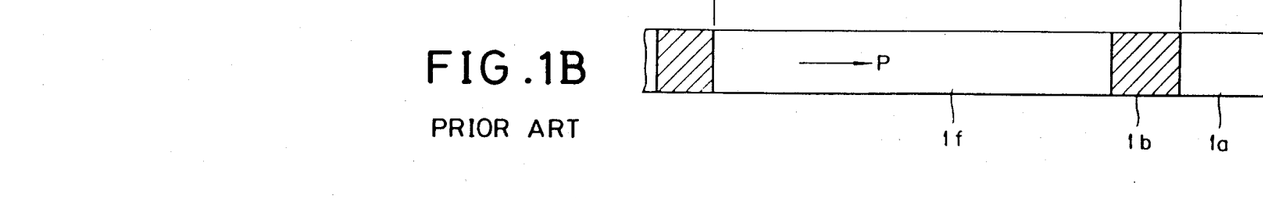

FIG. 1B is a developed view showing one track $1a$ on the disc and reference information is written into a hatched portion thereof. A period of rotation of the disc 1 is T and the direction of the rotation thereof is indicated by P. FIG. 1B corresponds to one of the most typical servo-surface-servo systems or a so-called index burst system in which the reference information $1b$ is written at one position at the end of the period of the rotation T. In the remaining region $1f$ corresponding to the remaining time interval of the period of the rotation T left after the reference information stored, there are provided, for instance, 32 data storage sectors defined and spaced apart from each other by a suitable gap in the longitudinal direction of the track $1a$. Each sector includes of course a data area into which required data is written or from which required data is read out, and an area for the storage of formatting data, an area for the storage of sync data for a read/write circuit and a margin area.

FIG. 1A shows an index pulse IDX in response to which the reference information $1b$ is written and the data is written into or read out from the region $1f$. The index pulse IDX is synchronized with the rotation of the disc and is generated during the period of rotation T by a spindle motor 3 shown in FIG. 4 for rotating the disc.

Figure 2:
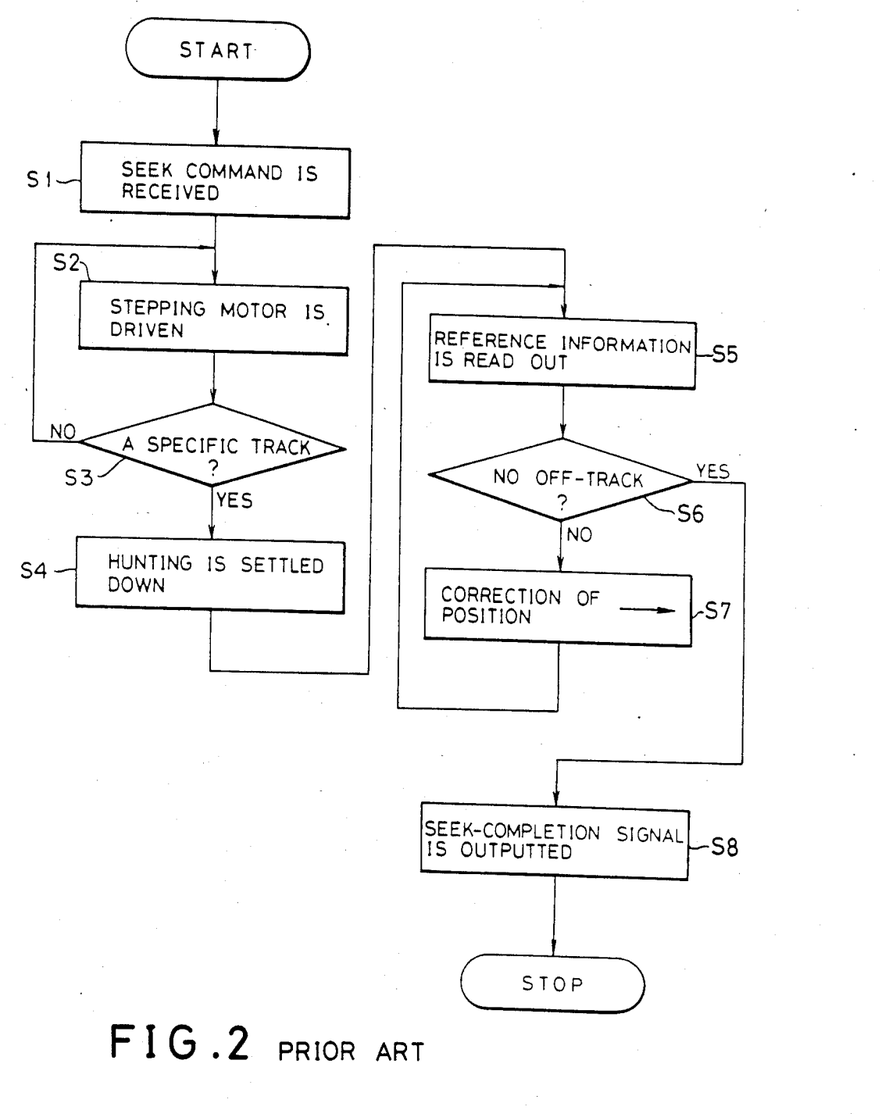
FIG. 2 is a flowchart illustrating an example of a seek operation for positioning a head to a desired track in a conventional head position control system.

FIG. 2 shows a flow of the steps of the seek operation in the above-described servo-surface-servo system. The operation is started when a disc storage unit such as a fixed disc unit receives a seek command from a computer at step S1. For instance, the seek command is in the form of the number of tracks between a starting track along which the head is positioned and a specific track of data to which the head must be shifted and properly positioned. In response to the seek command, a predetermined number of stepping pulses are applied to the stepping motor for rotating the disc so that the head is shifted at step S2. In the subsequent step S3, suitable means is used to judge whether or not the head is shifted to the specific track of data and the steps 2 and 3 are repeated until the judgement becomes affirmative, i.e., "YES". Even after the head has been brought to the specific track 1a, a hunting phenomenon occurs for a while before and after the head reaches the specific track, so that next step S4 is provided for settling down the hunting.

At step S5, the reference information 1b is read out after the hunting has been completely settled down and in the succeeding step S6, a deviation of the head from a proper or correct position, i.e., an amount of off-track is detected and then judges whether the detected deviation or off-track is within a predetermined tolerance band or not. If the deviation or off-track is in excess of a predetermined tolerance band, the position of the stepping motor is corrected at step S7 and thereafter the operation returns to step S5. In general, steps S5, S6 and S7 are repeated a few times and only after the off-track is eliminated, the operation first proceeds from step S6 to step S8, at which the signal representative of the completion of the seek operation is generated and delivered to the computer. Thus, the seek operation is completed.

In the fixed disc unit, a time required for completing the seek operation is equal to an average access time required for the head to travel $\frac{1}{3}$ of one whole track, for instance, about 100 msec. The problem resides in a time for reading out the reference information 1b at step S5. When the rotational speed of the disc is 3600 RPM, the sampling period for reading out the data once per rotation of the disc is about 17 msec. In addition, as described above, steps S5–S7 are repeated twice or three times and accordingly the step 5 alone requires 34–51 msec. In other words, a time equal to about $\frac{1}{3}$–$\frac{1}{2}$ of the seek time is used only in the step for reading out the reference information. This is the main reason why the conventional data-surface-servo system requires a substantially long access time for reading and writing information.

In order to eliminate the defect that the access time is long, the time required for completing step S5 can be reduced to 1/n by writing n pieces of reference information into a plurality of positions, respectively, in the circumferential direction of the track. However, the storage capacity is reduced or sacrificed accordingly. In addition, the reference information must be inserted between the data storage sectors and as a result, interchangeability of this fixed disc unit with a conventional fixed disc unit is not maintained.

SUMMARY OF THE INVENTION

In view of the above, it is an object of the present invention to provide a head position control system for a disc storage unit which can shorten an access time, while interchangeability with a conventional fixed disc unit is maintained.

In the present invention, two reference information storage regions are arranged on each major surface of each disc with an angular spacing of 360°/4N (where N is the number of discs). The reference information storage regions for the respective discs are equiangularly displaced from each other, so that the reference information is read out from the angularly displaced reference information storage regions during each one rotation of the disc so as to detect a displacement of the head from its normal or proper position every time that the reference information is read out, and the displacement of the head is corrected in accordance with the detected displacement.

A head position control system for a disc storage device in accordance with the present invention comprises:

a plurality of rotating discs as recording media;

a plurality of transducer heads, a position of each of which is controllable, for writing and/or reading out data in and/or from the corresponding major surface of each disc;

a plurality of tracks on each major surface of each of the discs for storing data;

two reference information storage regions extending radially and intersecting circumferentially the plurality of tracks so that two portions of each of the tracks are allotted to the reference information storage region to store reference information for detecting a position of each of the head in the reference information storage regions, the two reference information storage regions being arranged on each major surface of the plurality of rotating discs and being angularly displaced from each other by 360°/4N (where N is the number of the discs); positions of the reference information storage regions of one of the plurality of discs are equiangularly displaced from positions of the reference information storage regions of the other of the plurality of discs;

means for reading out reference information from the reference information regions which are angularly displaced from each other during one rotation of each of the discs;

means for detecting a deviation of one head from its normal position; and means for correcting a deviation of the one head in response to the detected deviation.

The head position control system may further comprise:

means for generating an index pulse in synchronism with rotation of the plurality of discs;

means for selecting one of the transducer heads in synchronism with the index pulse; and means for reading out reference information from the two reference information regions on one major surface of one of the plurality of discs through the selected transducer head.

In the head position control system, the two reference information regions on one major surface of one of the discs and the two reference information regions on the other major surface thereof may be radial symmetry with respect to the center of the disc.

According to the present invention, two reference information storage regions are provided on each major surface of each disc and are angularly spaced apart from each other by 360°/4N, so that while in a conventional head position control system reference information is received only once per one rotation of the disc, in the present invention reference information can be received every $\frac{1}{4}$N rotation of the disc, as if 4N reference information storage regions are provided on each major surface of the disc, so that an access time can be shortened.

In addition, the two reference information storage regions on each major surface of each disc are angularly displaced from each other by 360°/4N. Therefore, in case of using more than one (N≧2) discs, the regions between the two reference information storage regions (to be referred to as "auxiliary data regions" hereinafter in this specification) can be sufficiently narrowed. As a result, when a rotation speed of the disc is decreased by a speed corresponding to the reference information storage regions and the auxiliary data regions added to a conventional disc, the regions (to be referred to as "major data regions" hereinafter in this specification) other than the reference information storage regions and the auxiliary data regions on each major surface of the disc can ensure the same storage capacity as the conventional disc. Furthermore, the major data region has no reference information storage region, so that data can be recorded in accordance any desired format.

The above and other objects, effects, features and advantages of the present invention will become more apparent from the following description of preferred embodiments thereof taken in conjunction with the accompanying drawings.

DETAILED DESCRIPTION OF PREFERRED EMBODIMENTS

Figure 3:
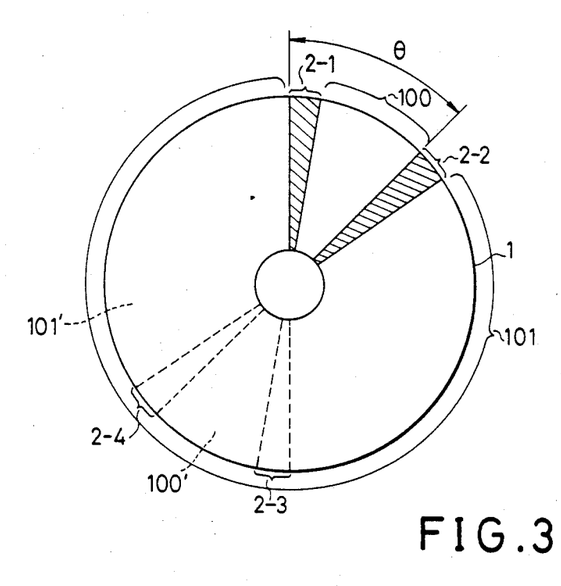
FIG. 3 is an explanatory diagram showing locations of the reference information storage regions on one major surface of a magnetic disc used in an embodiment of the present invention.

FIG. 3 shows locations of reference information storage regions on one major surface of a magnetic disc used in an embodiment of the present invention. Reference information storage regions 2-1 and 2-2 are provided on one major surface (front surface) of a magnetic disc 1 and are angularly spaced apart from each other by an angle $\theta$ and reference information storage regions 2-3 and 2-4 are provided on the other major surface (rear surface) of the disc 1 in a radial symmetry relationship with the reference information storage regions 2-1 and 2-2 with respect to the center of the disc 1. The angular distance $\theta$ between the two reference information storage regions 2-1 and 2-2 is made equal to $360°/4N$, where N is the number of magnetic discs used. An auxiliary data region 100 is provided on one major surface of the magnetic disc 1 between the two reference information storage regions 2-1 and 2-2, and a major data region 101 is provided on the remaining portion of the major surface; that is, on the portion other than the reference information storage regions 2-1 and 2-2 and the auxiliary data region 100. In like manner, an auxiliary data region 100' and a major data region 101' are provided on the other major surface of the magnetic disc 1.

Figure 4:
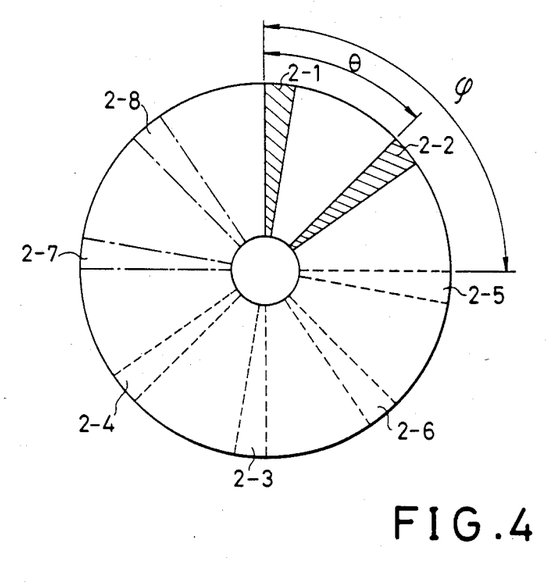
FIG. 4 is an explanatory diagram showing locations of the reference information storage regions when two magnetic discs are provided.

FIG. 4 shows locations of the reference information storage regions in case of two magnetic discs (N=2). In FIG. 4, two magnetic discs of the type described above with reference to FIG. 3 are stacked and are angularly displaced from each other by an angle of $\phi$. Reference information storage regions 2-5 and 2-6 are defined on one major surface of the second magnetic disc, while two reference information storage regions 2-7 and 2-7 are defined on the other major surface of the second disc. In this embodiment, the angular displacement $\phi$ is equal to $360°/2N$. It follows, therefore, that each reference information storage region is disposed at each of eight (4N) equi-angularly divided positions of the circumference of the magnetic disc when they are superimposed.

Figure 5:
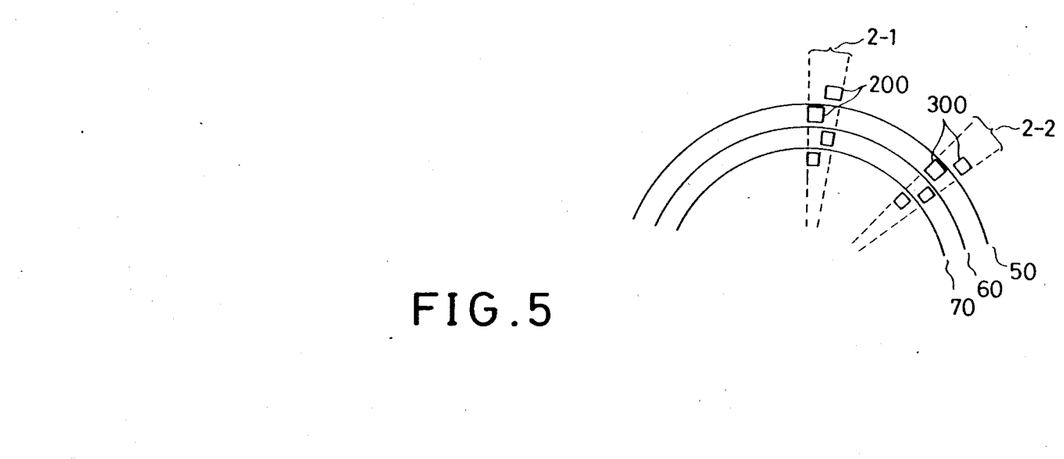
FIG. 5 is an explanatory diagram illustrating a manner how data are recorded on one major surface of a magnetic disc.

FIG. 5 shows a manner how data are recorded on the disc. A plurality of recording tracks 50, 60 and 70 are defined coaxially on the disc and reference data 200 and 300 are recorded in the reference information storage regions 2-1 and 2-2, respectively in order to detect the center of each track. As long as the center of each track can be detected, any type of conventional reference information or data can be used.

Figure 6:
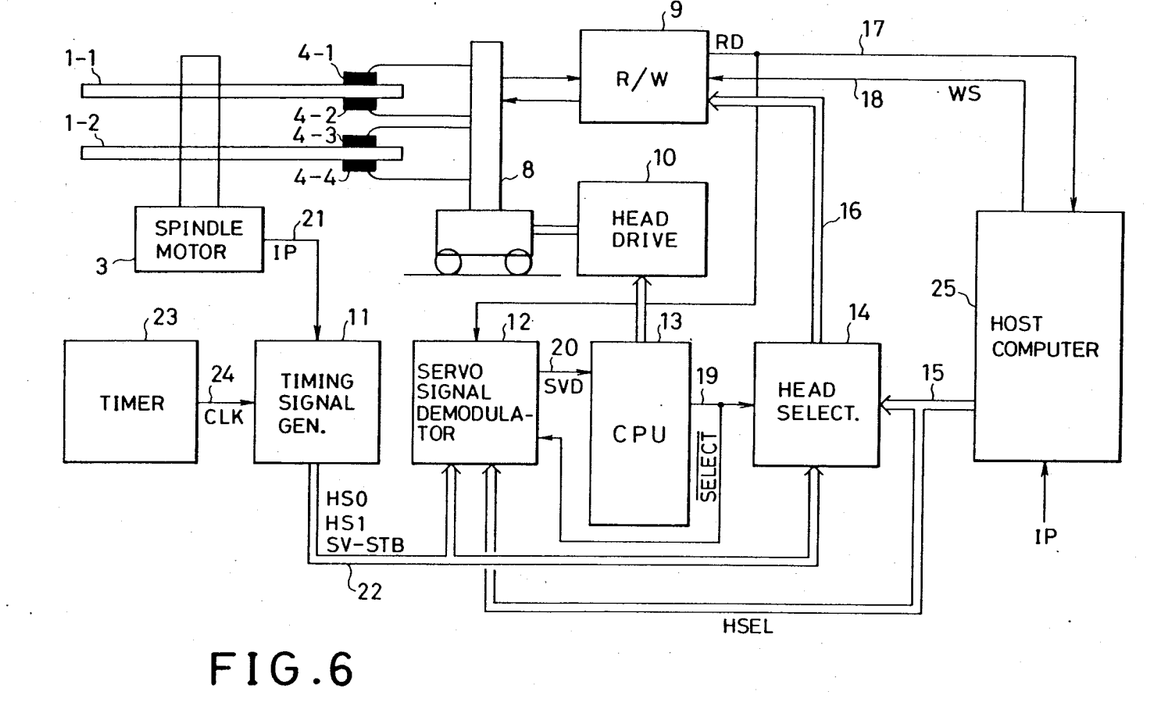
FIG. 6 is a block diagram showing an embodiment of a fixed disc storage unit with two magnetic discs in accordance with the present invention.
Figure 7:
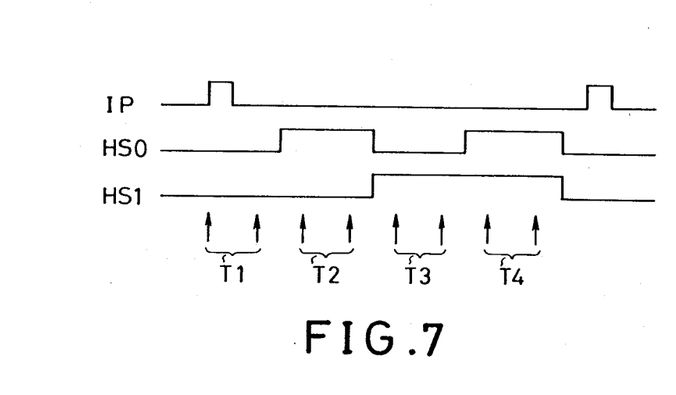
FIG. 7 is a timing chart used to explain head switching operations of the embodiment shown in FIG. 6.

FIG. 6 is a block diagram showing an embodiment of a fixed disc storage unit having two magnetic discs to which a head position control system in accordance with the present invention is applied. In FIG. 6, reference information is stored on the magnetic discs 1-1 and 1-2 in the manner described above with reference to FIG. 4. A spindle motor 3 rotates at a predetermined rotational speed and in this embodiment the motor 3 delivers an index signal IP to an index signal line 21, with one pulse per one rotation in synchronism with the rotaiton of the motor 3. As shown in FIG. 7, a timing signal generator 11 generates head-selection signals HS0 and HS1 in response to the index signal IP as a reference timing by counting the number of clocks CLK received through a signal line 24 from a timer 23 to supply the head selection signals HS0 and HS1 through a timing signal output line 22 to a servo signal demodulator 12 and a head selecting circuit 14. In the case of determining a position of each of the heads 4-1, ---, 4-4, the signal HS0 and HS1 select one of the four heads in accordance with a combination of the head selection signals which are in the form of a bit "0" or "1".

In FIG. 7, a period of time T1 corresponds to the two reference information storage regions on one major surface of the magnetic disc 1-1; a period of time T3, to the two reference information storage regions on the other major surface thereof; a period of time T2, to the two reference data storage regions on one major surface of the magnetic disc 1-2; and a period of time T4, to the two reference information storage regions on the other major surface thereof. During these periods T1, T2, T3 and T4, the corresponding magnetic heads 4-1, 4-3, 4-2 and 4-4 are switched in this sequence.

Referring back to FIG. 6, in response to a signal SELECT representative of a timing for starting a positioning mode and supplied from a CPU 13 through a signal line 19 to the head selecting circuit 14, the circuit 14 delivers the selection signal transmitted from the signal line 22 to a read/write circuit 9 through a signal line 16, so that in accordance with a combination of the selection signals HS0 and HS1 shown in FIG. 7, the heads 4-1, ---, 4-4 are automatically selected. When no $\overline{\text{SELECT}}$ signal is outputted to the signal line 19, the head selecting circuit 14 receives a head selection signal HSEL delivered through a head selection line 15 from a host computer 25 and transfers the signal HSEL through the output signal line 16 to the read/write circuit 9. The read/write circuit 9 instructs one of the heads selected in response to the head selection signals transmitted through the signals line 16 to switch to the "read" or "write" mode. A signal RD including data and the reference information read out from the selected head is then transferred through a read signal line 17 to the servo signal demodulator 12 and the host computer 25.

The servo signal demodulator 12 functions to extract, as servo data SVD, reference information with respect to a designated head from the RD signal transmitted through the read signal line 17. When the signal $\overline{\text{SELECT}}$ representative of the timing for starting the positioning mode is delivered from the CPU 13 to the signal line 19, a specific head is selected at the timing of a servo-strobe SV-STB from the timing signal generator 11, so that eight reference data or servo data SVD are derived from the demodulator 12 during one rotation of the magnetic discs and are outputted through a servo signal line 20 to the CPU 13.

In the case of a non-positioning mode during which no signal is outputted to the signal line 19, the servo signal demodulator 12 outputs only the reference information data SVD picked up by the head selected by the head selection signal HSEL supplied to the selecting circuit 14 through the head selection line 15 from the host computer 25, in response to the head selection signal HSEL from the host computer 25.

In response to the reference information data SVD thus inputted, the CPU 13 detects an amount of "off-track" between the selected head and a specific track to supply a correction amount corresponding to the "off-track" amount thus detected to a conventional head driving unit 10, so that the position of the head is corrected.

When the head position is corrected after the CPU 13 shifts the head from one track to a desired track and then stops the head there in accordance with the sequential processing shown in the flowchart in FIG. 2 as in the case of the conventional head position control system, the CPU 13 outputs the signal $\overline{\text{SELECT}}$ representative of the timing for starting the positioning mode to the signal line 19, so that in this embodiment, the reference information data SVD is obtained within an access time equal to ⅛ rotation of the magnetic disc at the most, as is clear from FIG. 4. Thus, the access time can be shortened and consequently the access time from the time that the seek command is generated to the time that the seek mode is completed can be shortened.

Further, reference numeral 8 represents a head carrier and 18 denotes a write signal line for a write signal WS connected to the host computer 25. Both the head carrier 8 and the write signal line 18 are well known in the art.

The rotational speed of the magnetic discs 1-1 and 1-2 is decreased by an amount corresponding to the reference information region 2-2 and the auxiliary data region 100 added to the conventional disc, so that the same storage capacity as the conventional disc is ensured only by the major data region 101. When the two discs are used as in this embodiment, the angular distance θ between these regions is equal to 45° and corresponds to ⅛ of the circumference of the disc. As a result, while the rotational speed of the conventional magnetic disc is, for instance, 3600 RPM, the rotational speed in this embodiment of the present invention is reduced to ⅞; that is, 3150 RPM. When the head which is selected through the head selection signal line 15 by the host computer 25 passes the second reference information storage region on the disc surface corresponding to the selected head (that is, when the selected head starts to track the main data region 100 for the first time), the host computer 25 receives the index pulse IP so as to perform writing or reading of data on the basis of the index pulse IP, so that interchangeability between systems of the present invention and the prior art can be maintained.

Figure 8:
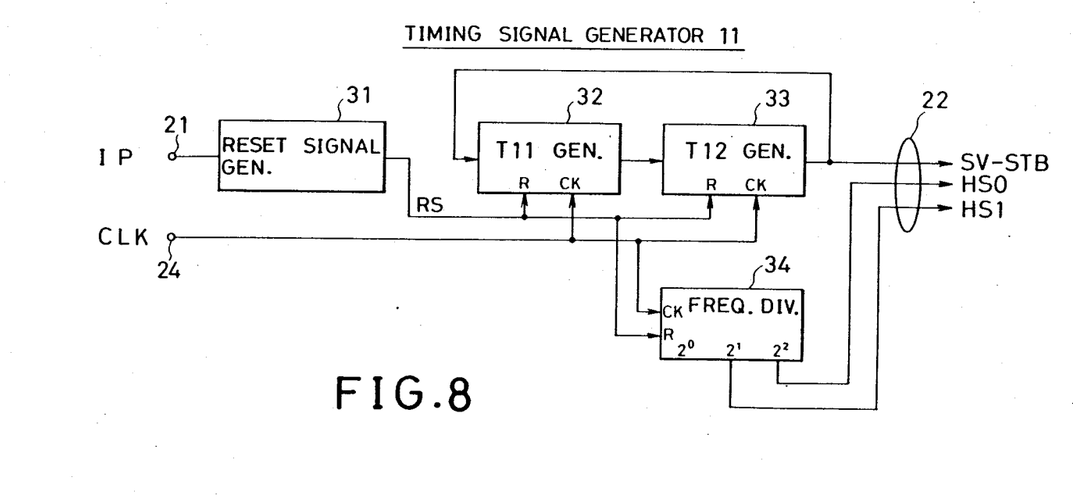
FIG. 8 is a block diagram showing an embodiment of the timing signal generator shown in FIG. 6.
Figure 9:
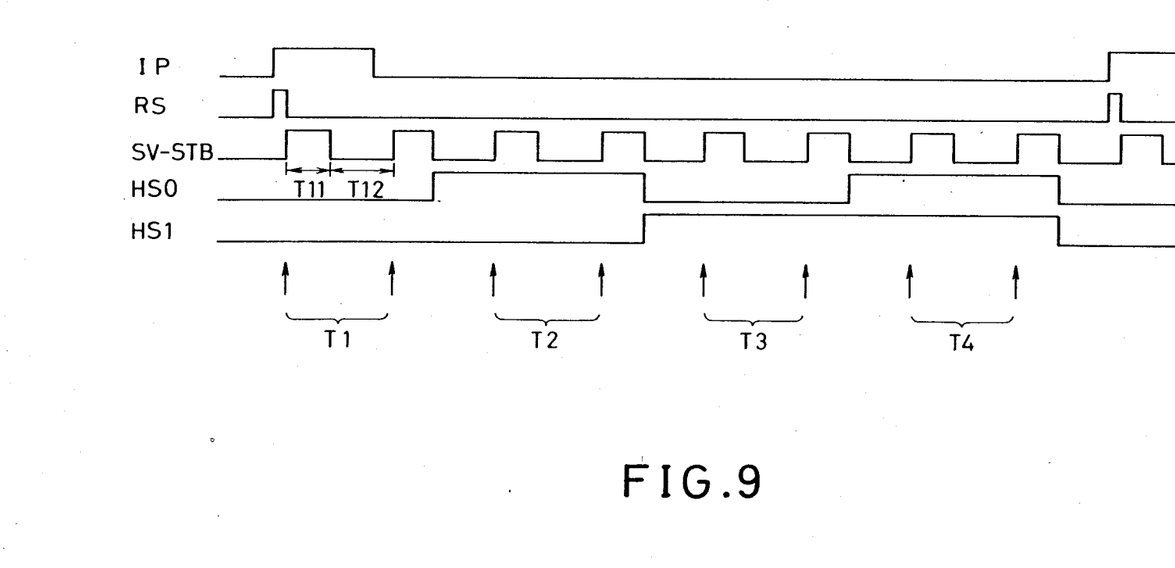
FIG. 9 is a timing chart used to explain operations thereof.

FIG. 8 shows a specific embodiment of the timing pulse generator 11 shown in FIG. 6. A reset signal generator 31 responds to the index pulse IP to generate a reset pulse RS as shown in FIG. 9 and can be, for instance, composed of a monostable multivibrator. Counters 32 and 33 are reset in response to the reset pulse RS as shown in FIG. 9 to start counting the clock pulses from the clock pulse generator 23 to produce the outputs at instants T11 and T12, respectively. The output from the counter 32 is supplied to the counter 33, from which the servo-strobe signal SV−STB is derived. A frequency divider 34 which can be composed of a counter is reset in response to the reset pulse RS, and then starts counting the clock pulses to generate the head selection signals HS0 and HS1 at the timings shown in FIG. 9.

Figure 10:
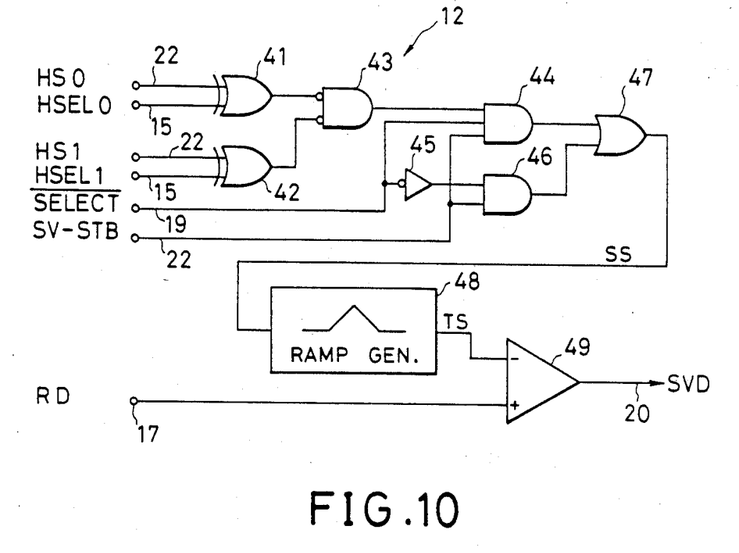
FIG. 10 is a block diagram showing an embodiment of the servo signal demodulator shown in FIG. 6.

FIG. 10 shows a detailed embodiment of the servo signal demodulator 12. Both the head selection signals HS0 and HSEL0 are applied to an exclusive OR gate 41, while the head selection signals HSL1 and HSEL1 are applied to another exclusive OR gate 42. The outputs from both the exclusive OR gates 41 and 42 are applied to a NOR gate 43 so that a NOR output is obtained when the head selection signal HS0 or HSEL0 or the head selection signal HS1 or HSEL1 appears. The NOR signal, the $\overline{\text{SELECT}}$ signal and the SV−STB signal are applied to an AND gate 44 which in turn outputs the SV−STB signal only when the NOR output "1" and the $\overline{\text{SELECT}}$ signal is "1". On the other hand, the $\overline{\text{SELECT}}$ signal is applied through an inverter 45 to another AND gate 36 together with the SV−STB signal, so that the SV−STB signal is outputted only when the $\overline{\text{SELECT}}$ signal is "0". Both of the outputs from the AND gates 44 and 46 are applied to an OR gate 47 which in turns produces a sync signal SS, which is supplied to a ramp signal generator 48. As indicated within the block of the ramp signal generator 48, the generator 48 generates a threshold signal having a triangular wave shape having a peak in the middle of the reference information in synchronism with the sync signal SS. The threshold signal TS thus obtained and the signal RD read out are applied to a comparator 49 to compare the pulse signal in the reference information signal contained in the signal RD with the threshold signal TS, so that when the peak value of this pulse signal exceeds the threshold signal TS, the reference information data SVD is generated. An embodiment of the ramp signal generator 48 is disclosed in detail in U.S. Ser. No. 895,032.

Figure 11:
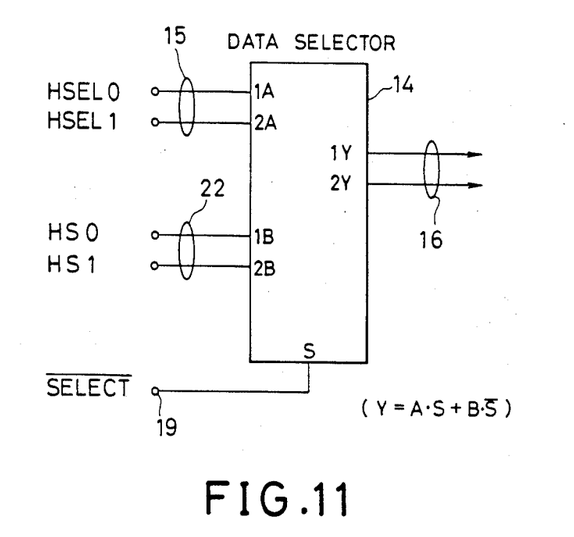
FIG. 11 is a block diagram showing an example of a data selector as the head selecting circuit shown in FIG. 6.

FIG. 11 shows an embodiment of a data selector which constitutes the head selecting circuit 14. The data selector 14 selects the head selection signals HSEL0 and HSEL 1 or HS0 and HS1 in accordance with the following relations:

$1Y = 1A \cdot S + 1B \cdot \overline{S}$ and $2Y = 2A \cdot S + 2B \cdot \overline{S}.$ That is, when the $\overline{\text{SELECT}}$ signal is "1", HSEL0 and HSEL1 are selected. When the $\overline{\text{SELECT}}$ signal is "0", HS0 and HS1 are selected. The selected signals are applied to the read/write circuit 9.

Referring back to FIG. 6, the read/write circuit 9 may be a 6-channel Read/Write IC HA 16652 MP manufactured by Hitachi Works. The CPU 13 may be an 8-bit microcomputer 8051 manufactured by Intel Corp.

So far the present invention has been explained in case of an embodiment where the two magnetic discs are used, but when only one magnetic disc is used, $\theta = 90°$ must be satisfied. In this case, from the standpoint of recording density, there is the possibility that it is difficult to decrease the rotational speed. Therefore, it is preferable to set $\theta$ equal to 45° in this case. When three or more magnetic discs are used, the greater the number of discs used, the smaller the angle $\theta$ becomes. However, it does not necessarily result in the decrease of the access time in proportion to the angle $\theta$. It is therefore apparent that it is not needed to uniformly angularly displace the reference information regions from each other and that an overlapping portion of the reference information regions may be permitted. For instance, when four discs are used, two sets each consisting of two discs as shown in FIG. 4 may be superimposed one upon another with the same angular arrangement for the two sets $\phi = 0$).

Furthermore, according to the present invention, the users may usually write or read the data into or from the main data region 101 in a manner substantially similar to the conventional manner. In addition, when a sector of the main data region 101 is damaged, an alternative sector can be provided in the auxiliary region instead of the damaged sector, so that the decrease in storage capacity resulting from the damaged sector can be compensated.

As described above, according to the present invention, there are provided two reference information regions on each major surface of a magnetic disc and the reference information storage regions are spaced apart from each other equiangularly by 360°/4N, so that reference information is obtained at every $\frac{1}{4}$N rotation and consequently an access time can be shortened. The angular distance between the two reference information regions on each major surface is 360°/4N, so that when two or more magnetic discs are used (N≧2), the reference information regions become sufficiently small in area. Therefore, when the rotational speed of the disc is decreased by an amount corresponding to an amount of reduction in the reference information regions, the same capacity as the conventional disc can be maintained only in the main data region. In addition, the data can be stored in the main data storage region. In addition, data can be stored in the main data region in any desired format, so that interchangeability between systems of the present invention and the prior art can be maintained and consequently the access time can be shortened without changing the host system. Moreover, the auxiliary region can be used as an alternative sector for a damaged sector in the main data region, so that the reduction in storage capacity due to the damaged sector can be sufficiently compensated.

What is claimed is:

1. A head position control system for a disc storage unit comprising:
   a plurality of rotating discs as recording media;
   a plurality of transducer heads, a position of each of which is controllable, for writing and/or reading out data in and/or from the corresponding major surface of each disc;
   a plurality of tracks on each major surface of each of said discs for storing data;
   two reference information storage regions extending radially and intersecting circumferentially said plurality of tracks so that two portions of each of said tracks are allotted to said reference information storage region to store reference information for detecting a position of each of said head in said reference information storage regions, said two reference information storage regions being arranged on each major surface of said plurality of rotating discs and being angularly displaced from each other by 360°/4N (where N is the number of said discs); positions of said reference information storage regions of one of said plurality of discs are equiangularly displaced from positions of said reference information storage regions of the other of said plurality of discs;
   means for reading out reference information from said reference information regions which are angularly displaced from each other during one rotation of each of said discs;
   means for detecting a deviation of one head from its normal position; and
   means for correcting a deviation of said one head in response to said detected deviation.

2. A head position control system as claimed in claim 1, further comprising:
   means for generating an index pulse in synchronism with rotation of said plurality of discs;
   means for selecting one of said transducer heads in synchronism with said index pulse; and
   means for reading out reference information from said two reference information regions on one major surface of one of said plurality of discs through the selected transducer head.

3. A head position control system as claimed in claim 1, wherein the two reference information regions on one major surface of one of said discs and the two reference information regions on the other major surface thereof are radial symmetry with respect to the center of said disc.

4. A head position control system as claimed in claim 2, wherein the two reference information regions on one major surface of one of said discs and the two reference information regions on the other major surface thereof are radial symmetry with respect to the center of said disc.

* * * * *